W. S. WILLS.
VEHICLE TRUCK.
APPLICATION FILED OCT. 23, 1914. RENEWED MAR. 8, 1917.
1,239,996.
Patented Sept. 11, 1917.
2 SHEETS—SHEET 1.
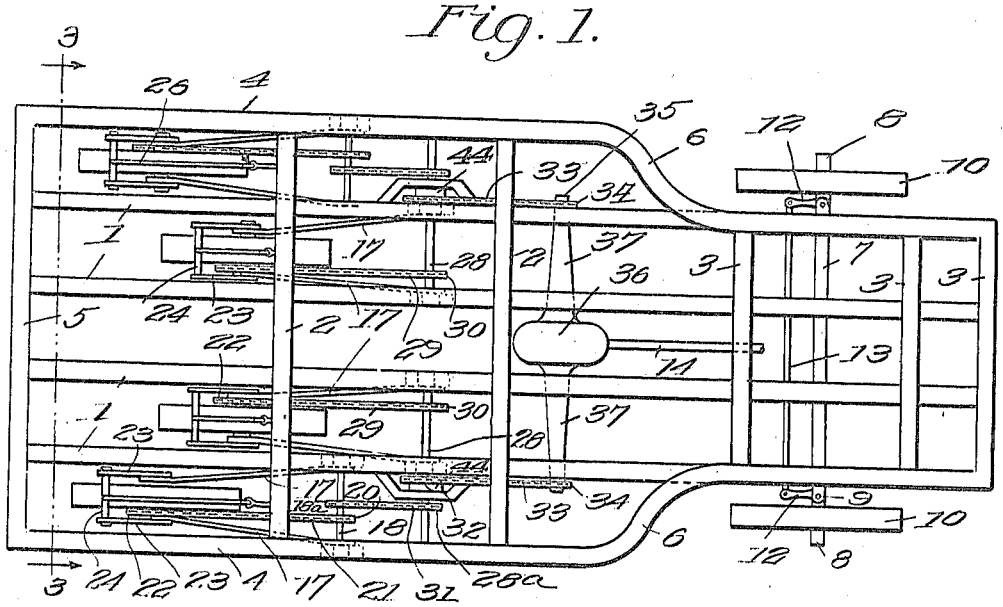
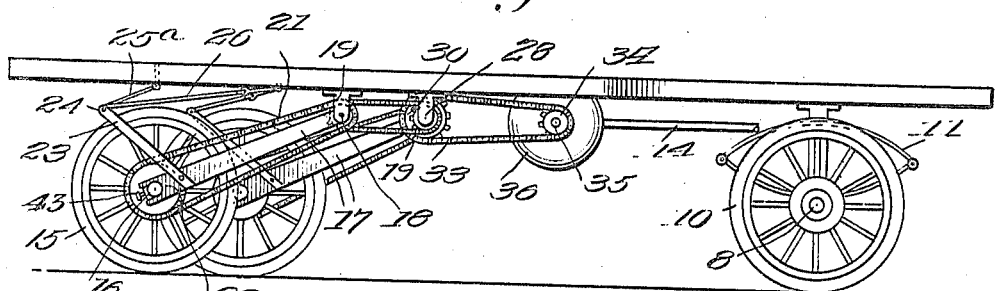
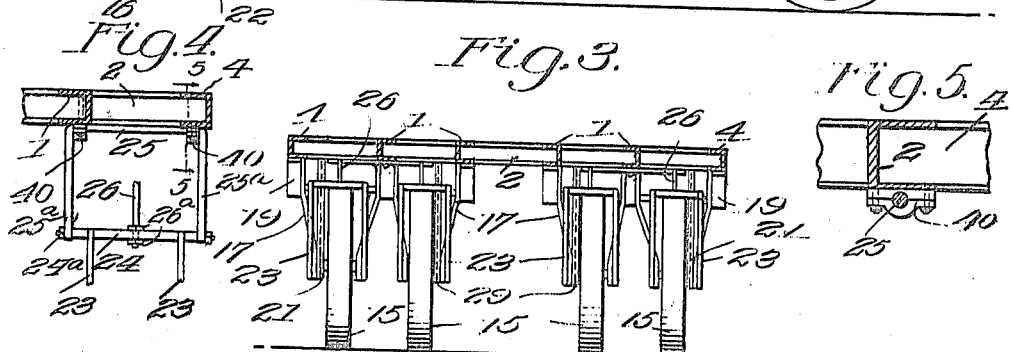
WITNESSES
INVENTOR
WILLIAM S. WILLS
BY Munn & Co.
ATTORNEYS

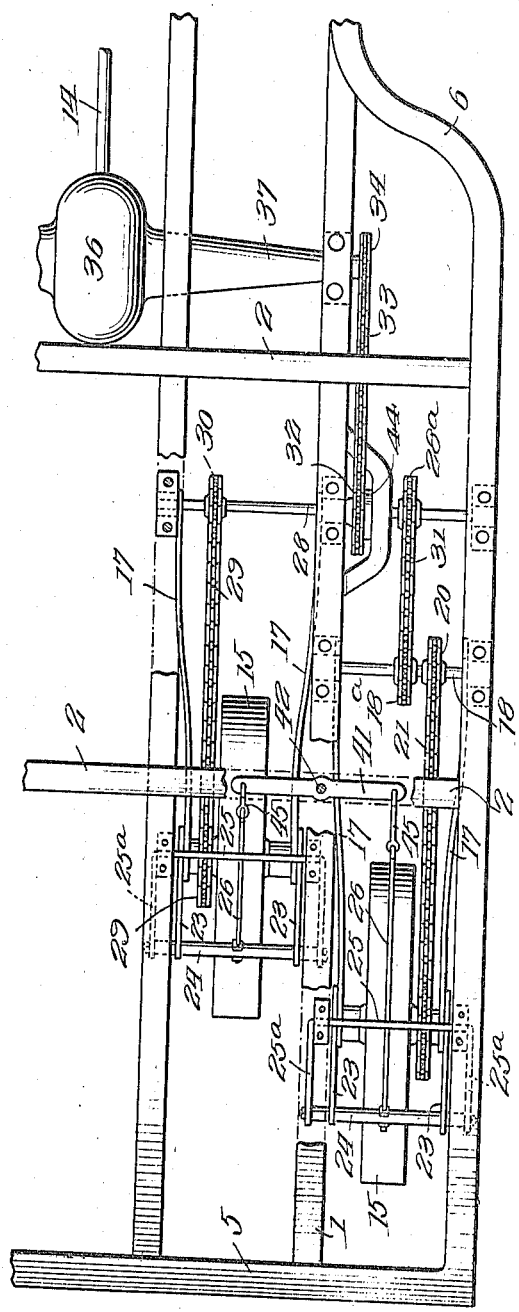

UNITED STATES PATENT OFFICE.

WILLIAM S. WILLS, OF COVINGTON, VIRGINIA.

VEHICLE-TRUCK.

1,239,996.   Specification of Letters Patent.   Patented Sept. 11, 1917.

Application filed October 23, 1914, Serial No. 868,338. Renewed March 8, 1917. Serial No. 153,458.

*To all whom it may concern:*

Be it known that I, WILLIAM S. WILLS, a citizen of the United States, and a resident of Covington, in the county of Alleghany and State of Virginia, have invented a new and useful Improvement in Vehicle-Trucks, of which the following is a specification.

My invention has for its object to provide mechanism by means of which the power in the flexible type of motor vehicles may be applied to four or more wheels instead of two, and to improve the arrangement and construction of the mechanism that connects the wheels with the truck to gain an increase in tractive power with the increased number of driving wheels, and to lessen the actual power needed on the part of the motor to drive the wheels.

A further object is to arrange the connecting mechanism in such manner as to more fully eliminate shock and jar with the consequent danger of breakage and the increased wear and tear on the motor, and to cause the vehicle to run more smoothly and evenly.

In the drawings:—

Figure 1 is a top plan view of the improved truck,

Fig. 2 is a side view,

Fig. 3 is a section on the line 3—3 of Fig. 1, looking in the direction of the arrows adjacent to the line, Fig. 4 is a rear view of the connection between the rear fork and the frame, Fig. 5 is a section on the line 5—5 of Fig. 4, looking in the direction of the arrow adjacent to the line, and Fig. 6 is an enlarged partial plan view of the frame.

In the present embodiment of the invention the frame of the vehicle consists of bars 1, arranged in spaced parallel relation and connected by cross bars 2, intermediate their ends, and by other cross bars 3 near their front ends. Other bars 4 are arranged at the outside of the bars 1, and the rear ends of the bars 1 and 4 are connected by a cross bar 5.

Each of the bars 4 is bent inwardly at its front end as indicated at 6 to the adjacent bar 1, joining the said bar just in rear of the front axle 7. Thus the rear end of the frame is increased in width in order to provide for the series of rear wheels within the frame. The front axle 7 is provided with the usual spindles 8 and the spindles are pivoted to the ends of the axle as indicated at 9. Wheels 10 are journaled on the spindles, and springs 11 are arranged between the axle and the frame. Each spindle is provided with the usual steering arm 12, and the arms are connected by a steering bar 13 in rear of the axle.

The usual steering mechanism not shown may be connected with the bar 13 in any usual or desired manner. The motor, not shown, is supported in the usual manner at the front portion of the frame, and the driving shaft 14 is connected to the motor in any ordinary or desired manner. The particular arrangement of the frame provides for a wider portion at the rear, and the rear wheels are arranged beneath the said wider portion.

There are four rear wheels in the present instance, and each of the wheels 15 is secured to a stub shaft 16. Each stub shaft is journaled in recesses in the rear ends of the members 17 of a pair of front forks in the same manner as a bicycle wheel, and each of the front forks is mounted to swing on a shaft on the frame. Preferably the rear supporting wheels are not arranged with their axes in the same straight line transversely of the frame.

A series of rear wheels is arranged at each side of the frame, the members of each series being two in the present instance, although it is obvious that this number might be increased. The outermost wheels are arranged in rear of the innermost wheels, and the front forks of the outermost wheels are mounted at their front ends to swing on countershafts 18, which are journaled in bearings 19, depending from the frame.

A sprocket chain 21 connects the stub shaft with the shaft 18, the said chain engaging a sprocket wheel 20 on the shaft 18, and a sprocket wheel 22 on the stub shaft or axle. The front forks of the innermost wheel of each series are mounted to swing on operating shafts 28, each shaft being journaled on the frame in depending bearings 19, parallel with the shaft 18 and the shafts 28 at each side of the frame are in alinement as shown more particularly in Fig. 1.

The sprocket wheel 22 on the axle of each innermost wheel is connected to a sprocket wheel 30 on the adjacent operating shaft 28 by means of a sprocket chain 29, and each shaft 18 is connected to the adjacent operating shaft by means of a sprocket chain 31, which connects a sprock wheel 18ᵃ on the shaft 18 with a sprocket wheel 28ᵃ on the shaft 28.

Each of the rear forks consists of two members 23, each member being connected at its lower front end to the adjacent member 17 of the front fork and at its rear outer end to a shaft or bolt 24, the said shaft or bolt connecting the two members of the fork of the adjacent wheel. The connection between each member 23 and the adjacent member 17 is a pivotal connection, and each shaft 24 is supported from the frame of the vehicle.

Each of the said shafts 24 is journaled in the arms 25ᵃ of a substantially U-shaped bracket, consisting of a body 25 and the arms 25ᵃ. The body 25 of each bracket is journaled in sectional bearings 40 on the under side of the frame, and a link 26 extends from each shaft forwardly to a connection with the balancing mechanism to be later described. Each of the links 26 has its rear end threaded and passed through an opening in the adjacent shaft 24, and lock nuts 26ᵃ are threaded on to the link on opposite sides of the shaft.

The members 23 of the rear fork are spaced apart inwardly from the arms 25ᵃ of the U-shaped brackets and spacing sleeves or arbors may be arranged on the shafts between the members 23 of the rear fork and between the said members and the arms 25ᵃ of the bracket.

A lever 41 is pivoted to the under side of the frame intermediate its ends, as indicated at 42, and between the two rear wheels at that side of the frame, and the links 26 of the two wheels are connected with the opposite ends of the lever. The arrangement is such that when for instance, the outermost wheel moves upward the end of the lever 41 adjacent thereto will be swung rearwardly, and the end of the lever adjacent to the innermost wheel will move forwardly. Thus the wheels at each side are balanced against each other.

It will be understood that each of the rear wheels is similarly supported by a front and rear fork, and the axles 16 of the rear wheels are held in openings in the lower rear end of the front fork by means of set screws 43 or the like in the same manner that a bicycle is mounted in its forks.

Each of the operating shafts 28 is sectional, the sections of the shaft being in alinement and co-axial, and connected by a differential held in the casing 44. The driving shaft 14 which is driven by the motor is connected to a sectional shaft 35, journaled on the frame below the same, the sections of the shaft being connected by a differential in the casing 36, which is interposed between the housings 37 that house the sections of the shaft 35. Each section of the shaft 35 is provided at its outer end with a sprocket wheel 34, and each wheel 34 is connected to a wheel 32 on one of the sections of the adjacent shaft 28 by means of a sprocket chain 33.

Thus all of the stub shafts or axles 16 are driven from the motor through the shafts 14, 35, 28 and 18, and differentials are arranged between the series of wheels at each side of the frame and between the individual wheels of the series.

The motor shaft drives both operating shafts 28 through the differential in the casing 36 and the shafts 28 drive the rear wheels, each shaft driving the wheels of the adjacent series. The innermost wheels of each series take their power directly from the operating shaft, while the outermost wheels take their power indirectly from the said shafts. When any rear wheel meets an obstruction it may swing upward, the members 17 of the front fork swinging on the adjacent shaft 18 or 28, as the case may be. As the wheel moves upward, the shaft 24 adjacent thereto is moved rearward and upward, and the link 26 is pulled rearwardly. This swings the outer end of the adjacent lever 41 rearwardly swinging the inner end forwardly and tending to push the adjacent innermost wheel downwardly.

Thus the wheel that moves upward, that is, the obstructed wheel is relieved of a great portion of the load upon the vehicle. For instance, should an obstruction raise one wheel six inches the adjacent wheel is forced downwardly the same distance and hence the bed or frame of the vehicle is raised but three inches. The arrangement provides also for a better distribution of the weight of the vehicle, since it is obvious that there is less danger of breakage where the weight is held by four wheels instead of two as in the ordinary construction. In addition the power of the engine or motor is increased because of the greater tractive force of the wheels.

It is obvious that any number of rear wheels may be used, the wheels being arranged in series as shown. For instance six wheels or eight wheels might be used. All of the wheels swing on an arc whose center is the pivotal connection of the front forks with the frame and because of this the driving connection between each wheel and the shaft upon which it swings will not be affected. There is very little shock and jar that will not be absorbed before reaching the frame and thus the danger of breakage to the vehicle or the motor is reduced to a minimum.

The motor because of this smooth support will have a longer length of life and will be able to utilize its power to better advantage. The links 26 are rigid, and each is connected indirectly to the lever 41 at its front end, the connection being made by means of an auxiliary link 45.

It will be understood that there is no connection between the series of wheels at one side of the vehicle and the series at the other except through the differential so that the wheels at one side of the vehicle are not affected by the movement of the wheels at the other side.

I claim:—

1. In a motor vehicle, the combination with the frame and the front wheels for supporting and guiding the frame, of a series of rear wheels at each side of the frame and below the same, front and rear bearing forks for each wheel, the wheel being journaled in the front fork at the rear thereof and the front fork being pivoted to the frame at the front end thereof, the rear forks being pivoted to the front forks adjacent to the wheel, a swinging support connecting the rear end of each rear fork with the frame, a lever pivoted to the frame intermediate its ends between the members of each series of wheels and in front of the same, and a rigid connection between the swinging support of each rear fork and the adjacent end of the lever.

2. In a motor vehicle, the combination with the frame, of a series of rear wheels at each side of the frame, a pair of bearing forks for supporting each wheel, one of the said forks extending forwardly and upwardly and pivotally connected to the frame, the other fork extending rearwardly and upwardly and pivoted to the front fork adjacent to the wheel, a yoke-shaped bracket comprising a body journaled on the frame and arms extending rearwardly and downwardly and pivotally connected to the upper end of the rear fork, a lever pivoted intermediate its ends to the frame between the members of each series of wheels and in front of the same, and a rigid connection between each end of the lever and the pivotal connection between the adjacent bracket and rear fork.

3. In a motor vehicle, the combination with the frame, of a series of rear wheels at each side of the frame, an operating shaft for each wheel, a pair of bearing forks arranged between each operating shaft and the adjacent wheel, the members of each pair being journaled on the shaft at their front or upper ends, and rotatably supporting the wheel at their rear or lower ends, a driven shaft, a differential connecting the driven shaft to the operating shafts at each side to permit the shafts of one series to move angularly with respect to the shafts of the other series, and a yielding connection between the rear ends of each pair of forks and the frame.

4. In a motor vehicle, the combination with the frame, of a plurality of rear wheels at each side of the frame, a swinging connection between each wheel and the frame in front of the wheel, a yoke-shaped bracket comprising a body and arms adjacent to each wheel, the body of each bracket being journaled transversely of the frame above the center of the adjacent wheel, and the arms of each bracket extending downwardly and rearwardly, a shaft journaled in the arms, a connection between the shaft and the swinging connection of the adjacent wheel, and a balanced connection between the shafts of the wheels of each series.

WILLIAM S. WILLS.

Witnesses:
   R. W. CROWDER,
   C. H. RENESCOMB.